United States Patent
Dupuy et al.

(10) Patent No.: US 12,378,157 B2
(45) Date of Patent: Aug. 5, 2025

(54) APPARATUS FOR REMOVING AT LEAST ONE PORTION OF AT LEAST ONE COATING SYSTEM PRESENTING A MULTI-GLAZED WINDOW AND ASSOCIATED METHOD

(71) Applicants: AGC GLASS EUROPE, Louvain-la-Neuve (BE); EURO-MULTITEL, Mons (BE)

(72) Inventors: Julien Dupuy, Mons (BE); Yves Hernandez, Mons (BE); Jerome Hily, Mons (BE); Eric Morgante, Gosselies (BE)

(73) Assignees: AGC GLASS EUROPE, Louvain-la-Neuve (BE); EURO-MULTITEL, Mons (BE)

( * ) Notice: Subject to any disclaimer, the term of this patent is extended or adjusted under 35 U.S.C. 154(b) by 350 days.

(21) Appl. No.: 17/904,345

(22) PCT Filed: Feb. 5, 2021

(86) PCT No.: PCT/EP2021/052870
§ 371 (c)(1),
(2) Date: Aug. 16, 2022

(87) PCT Pub. No.: WO2021/165064
PCT Pub. Date: Aug. 26, 2021

(65) Prior Publication Data
US 2023/0083188 A1  Mar. 16, 2023

(30) Foreign Application Priority Data

Feb. 18, 2020 (EP) .................................. 20158008

(51) Int. Cl.
*C03C 23/00* (2006.01)
*B23K 26/03* (2006.01)
(Continued)

(52) U.S. Cl.
CPC ........ *C03C 23/0025* (2013.01); *B23K 26/032* (2013.01); *B23K 26/048* (2013.01);
(Continued)

(58) Field of Classification Search
CPC .............. B23K 2103/54; B23K 26/032; B23K 26/048; B23K 26/0884; B23K 26/352;
(Continued)

(56) References Cited

U.S. PATENT DOCUMENTS

| 8,927,069 B1 | 1/2015 | Estinto et al. | |
| 2003/0029848 A1* | 2/2003 | Borgeson | B23K 26/0838 219/121.68 |

(Continued)

FOREIGN PATENT DOCUMENTS

| EP | 2 500 685 A1 | 9/2012 |
| WO | WO 2015/050762 A1 | 4/2015 |

OTHER PUBLICATIONS

International Search Report issued Apr. 19, 2021 in PCT/EP2021/052870 filed on Feb. 5, 2021, citing documents 1-7 & 15-16 therein, 3 pages.

*Primary Examiner* — Philip C Tucker
*Assistant Examiner* — Jimmy R Smith, Jr.
(74) *Attorney, Agent, or Firm* — Oblon, McClelland, Maier & Neustadt, L.L.P.

(57) ABSTRACT

An apparatus for removing a portion of a coating system present in a multi-glazed window including: a decoating component to focus a laser source at a focus distance; two motors to move the decoating component along the X and Y axis; one optical system to detect on which interface the coating system is localized, and to estimate a distance between the decoating component and the detected interface; a third motor to control the position of the decoating component along a Z axis; and a displacement control unit (Continued)

of the third motor to displace the decoating component of a displacement distance equal to the difference between the estimated distance and said the distance in order to focus the decoating component on the detected interface.

13 Claims, 5 Drawing Sheets

(51) Int. Cl.
*B23K 26/04* (2014.01)
*B23K 26/08* (2014.01)
*B23K 26/352* (2014.01)
*B23K 103/00* (2006.01)
*C03C 17/36* (2006.01)

(52) U.S. Cl.
CPC ........ *B23K 26/0884* (2013.01); *B23K 26/352* (2015.10); *B23K 2103/54* (2018.08); *C03C 17/366* (2013.01); *C03C 2218/328* (2013.01)

(58) Field of Classification Search
CPC ............ C03C 17/366; C03C 2218/328; C03C 23/0025; B32B 43/006
See application file for complete search history.

(56) References Cited

U.S. PATENT DOCUMENTS

| | | |
|---|---|---|
| 2003/0209527 A1 | 11/2003 | Borgeson et al. |
| 2005/0016972 A1 | 1/2005 | Borgeson et al. |
| 2015/0093466 A1 | 4/2015 | Estinto et al. |
| 2015/0093554 A1 | 4/2015 | Estinto et al. |
| 2018/0036839 A1 | 2/2018 | Estinto et al. |

\* cited by examiner

APPARATUS FOR REMOVING AT LEAST ONE PORTION OF AT LEAST ONE COATING SYSTEM PRESENTING A MULTI-GLAZED WINDOW AND ASSOCIATED METHOD

TECHNICAL FIELD

The present invention relates to an apparatus and a method for removing at least one portion of at least one coating system in a multi-glazed window comprising at least two glass panels alternatively separated by at least one interlayer, forming multiple interfaces.

This invention is preferably used to modify the electromagnetic properties of a multi-glazed window already mounted on a structure, for instance a building or a vehicle. This modification is achieved by partially decoating at least one coating system included inside said multi-glazed window.

Thus, the invention concerns multiple domains where multi-glazed windows including at least one coating system are used and removing part of said coating system is required.

BACKGROUND

A standard single-layered window has poor thermal performances. This is why most windows are now built using two or more glass panels separated by a gas-filled or polymer-based interlayer. This kind of window is called a multi-glazed window.

A coating system can be applied on the surface of one or several glass panels inside a multi-glazed window in order to further improve the multi-glazed window properties.

This coating system can either improve the multi-glazed window insulation, reduce the amount of infrared and/or ultraviolet radiation entering the multi-glazed window or keep the sun's heat out of a space.

However, this coating system is generally metal-based and acts as a Faraday cage to prevent electromagnetic waves such as radio waves from entering or leaving a space.

In order to improve the transmittance of a multi-glazed window containing a coating system, it is possible to use a laser decoating system. Said laser decoating system removes at least one portion of the coating system. The total decoated surface must be between 1 and 3% of the total coating system surface in order to both improve the transmission of radio waves through the multi-glazed-window and preserve the properties of said coating system.

Preferably, to improve the transmission of a radio wave through the window, the decoating system will remove segments from the coating system and the sum of the longest sub-segment of each segment is equal to $n\lambda/2$ wherein n is a positive integer greater than zero and lambda ($\lambda$) is the wavelength of the radio wave. It is necessary to have a wide band frequency selective surface in order to ensure the transmission of waves with different frequencies through the multi-glazed window. Typically between 2 GHz and 60 Ghz. For instance, the decoating system can be configured to remove a segment of a length greater than 400 mm and a width between 10 and 100 µm.

To improve the transmittance of said multi-glazed window, WO 2015/050762 describes an apparatus comprising a laser light source and a lens array configured to focus said laser light source on a coating system of a multi-glazed window. Said apparatus is mounted on suction pads to secure said apparatus on said multi-glazed window. Said apparatus also comprises at least two motors configured to move said laser along rails along the X and Y axis. Said laser is capable of scribing a grid shape on said coating system to improve the electromagnetic transmission of said multi-glazed window.

However, said laser is always focused on the internal surface of the second glass panel in the multi-glazed window. In fact, this apparatus is only calibrated for a single type of double-glazed window where the coating system is positioned on said third interface. Hence, it is not possible to adapt said apparatus to other kind of windows where the glass thickness is different or where the coating system is applied in a different interface.

In another domain, U.S. Pat. No. 6,559,411 describes an apparatus for laser scribing a tin oxide layer coated on a glass sheet substrate.

A predetermined scribing is formed on said tin oxide layer by focusing a laser on said tin oxide layer and by displacing said glass sheet substrate by a conveyor along the X or Y axis. Moreover, the position of the laser is adjusted in the Z direction during the laser scribing to maintain the focusing on said tin oxide layer.

However, this focusing requires a complete knowledge of the glass sheet substrate including the thickness of each layer and the position of said tin oxide layer together with a knowledge of a precise distance between the conveyor and the laser.

Thus, this apparatus can only be used in factories on glass sheet substrates that have just been manufactured. Hence, this apparatus cannot be used on a multi-glazed window of unknown composition that is already mounted on a structure, for instance a building or a vehicle.

In addition, a large number of windows are already installed, cannot be replaced or with important costs and are known to avoid electromagnetic waves transmission. Such situations require the decoating process to be carried out on site. In most cases, the composition of these multi-glazed windows and the exact position of their coating system is completely unknown. It is therefore impossible to focus the laser on said coating system by such apparatus.

Hence, the ongoing technical issue is to obtain a decoating system that can be used on multiple kind of multi-glazed windows including at least one coating system, where the position and the thickness of the glass panels and the position of the at least one coating system in not known; and able to work when said multi-glazed window is already mounted on a structure.

BRIEF SUMMARY OF THE INVENTION

The invention solves this technical issue by using at least one optical system configured to detect the position of said coating system along with a displacement control unit configured to move the position of the laser in view of said detected position of the coating system. In other words, the invention relates to an apparatus for modifying at least one coating system in a multi-glazed window of unknown composition.

According to a first aspect, the invention concerns an apparatus for removing at least one portion of at least one coating system present in a multi-glazed window comprising at least two glass panels alternatively separated by at least one interlayer, forming multiple interfaces; the apparatus comprising:

decoating means including a laser source and a lens array configured to focus said laser source at a focus distance; and two motors configured to move said decoating means along a plane, defined by a longitudinal axis X and a transversal axis Y.

This invention is characterized in that said apparatus comprises:
- one optical system configured to detect on which interface said coating system is localized, and to estimate a distance between said decoating means and the detected interface;
- at least a third motor configured to control the position of said decoating means along a Z axis, orthogonal to the X and Y axis;
- a displacement control unit of said third motor configured to displace said decoating means of a displacement distance equal to the difference between the estimated distance and said focus distance in order to focus said decoating means on said detected interface of at least one coating system.

The invention permits to remove a portion of a coating system, for instance to improve the electromagnetic transmission of a multi-glazed window. Moreover, the invention provides a focusing of said decoating means on said coating system even if the structure of said multi-glazed window is unknown. Thus, the apparatus of the invention can be used to improve the electromagnetic properties of a multi-glazed window already mounted on a structure, for instance a building or a vehicle.

Indeed, to work correctly, the laser source of a decoating system must be positioned at a sufficient distance from the window in order to avoid any degradation during the movements of the decoating means. Typically, the laser is positioned at a working distance of 160 mm from the window.

According to an embodiment, the position of said decoating means is obtained by:
- at least two fixing points configured to mount said apparatus on a first interface of said multi-glazed window;
- a support structure mounted on said at least two fixing points;
- a robot head mounted on said support structure movable by said two motors along said longitudinal axis X and transversal axis Y relative to said support structure; and
- a shuttle, carrying said decoating means, mounted on said robot head movable by said third motor along said Z axis relative to said robot head.

Using the fixing point, the apparatus can be installed on a multi-glazed window already mounted on a structure. The fixing points preferably correspond to suction pads or similar means, for instance four suction pads. These suction pads are configured to fix the support structure by suction of the air between these suction pads and said first interface. However, this suction cannot be precisely the same between the different suction pads. Thus, the support structure cannot be precisely parallel to the first interface. Moreover, the multi-glazed window can present unevenness or curvatures.

Preferably, said shuttle is movable along the Z-axis between 100 and 500 mm away from said first interface of said multi-glazed window. This movable distance of the shuttle permits to adapt the apparatus to curved windows.

In order to correctly decoat a coating system, the laser source must be precisely focused onto the targeted coating system. To this end, the position of the coating system must be known with a precision at least three times smaller than the depth of field of the decoating means. The depth of field corresponds to a distance around the focal point of a focused laser beam where the laser beam diameter is considered constant. This distance depends a lot on the laser beam characteristics and the optics used for focusing said laser beam. Typically, the depth of field is around 0.5 mm, which means that the precision on the focus position of the said decoating means should be around 0.1-0.2 mm.

Considering the variable distance between the support structure and the windows and the required precision, the invention proposes to move the decoating means before the decoating process to focus the laser on the coating system.

Thus, the power of the laser can be limited to the required power to decoat the coating system and the risk of degradation of the other part of the multi-glazed windows is limited.

To this end, an optical system is used to detect on which interface said coating system is localized, and to estimate a distance between said decoating means and the detected interface.

According to one embodiment, the detection on which interface said coating system is localized is obtained by a near infrared unit comprising:
- at least one near infrared light source configured to emit an incident light toward said multi-glazed window, and to generate a diffraction pattern after refraction on the multi-glazed window; and
- at least one detector configured to measure the intensity of the light spots of said diffraction pattern; each light spot corresponding to an interface in said multi-glazed window; a spot of maximum intensity corresponding to said detected interface on which said coating system is localized.

Even if other known devices can be used to detect the coating system, this near infrared unit permits to detect efficiently the coating system because this coating system generally uses a metal-based layer and infrared light is highly refracted by this type of layer.

Moreover, the environment surrounding a window already mounted on a structure is generally perturbed by external light sources: sun, indoor lamps . . . . This embodiment limits the risk of wrong detection because the infrared detection is less perturbed by this kind of external light sources such as artificial lights, sun lights, . . . .

Preferably, said at least one near infrared light source is monochromatic with a wavelength comprised between 700 and 1100 nm, preferably 850 nm. This wavelength range is efficient to limit the perturbations produced by the external light sources.

Preferably, said at least one detector of said near infrared unit corresponds to an array of photodiodes, a CMOS camera sensor or a 2D silicon detector. These types of detectors permit to obtain a correct detection of the diffraction pattern.

Preferably, said near infrared unit is fixed relative to said support structure. Indeed, the infrared unit does not need to be placed at a specified distance from the decoating means and it can be mounted anywhere on the apparatus, i.e. limiting the perturbation for the decoating means. Preferably, said near infrared unit detector should be positioned to form an angle between 10° and 80° with the multi-glazed window.

Thus, the near infrared unit is capable of detecting accurately the interface where the coating system is positioned inside an unknown multi-glazed window.

To estimate the distance between the decoating means and the detected interface, the invention can use any known device.

According to one embodiment, the estimation of a distance between said decoating means and said detected interface is obtained by a confocal unit comprising:

at least one polychromatic light source configured to emit an incident light, punctual or in line, with several wavelengths toward said multi-glazed window, an optical element focalizing said incident light with different focus distances depending on the wavelength; and at least one detector configured to receive the light refracted by said multi-glazed window and detect the light intensity for each wavelength of said polychromatic light source; the wavelengths with intensity peaks being the ones with a focus distance corresponding to an interface in said multi-glazed window; said estimated distance being calculated based on the wavelength with intensity peak associated to said detected interface.

This embodiment permits to obtain the distance between the confocal unit and the detected interface with a good precision. With this distance, it is possible to estimate the distance between the decoating means and the detected interface knowing the displacement of the decoating means relative to the confocal unit.

To improve the estimation of the distance between the decoating means and the detected interface, said at least one polychromatic light source and said at least one detector are preferably mounted on said shuttle with a fixed distance from the decoating means along said Z-axis.

Using the near infrared unit and the confocal unit, the apparatus can obtain the displacement required of the decoating means with a calculation unit configured to:

determine the number of said interfaces detected by said confocal unit in view of the number of wavelengths with intensity peaks;

estimate the distances between said confocal unit and said interfaces, preferably with a precision under 0.1 mm;

identify at least one most relevant interface corresponding to a spot of maximum intensity detected by said near infrared unit;

retrieve said estimated distance of the detected interface matching with said identified most relevant interface;

calculate said estimated distance between said decoating means and said detected interface equal to the sum of said retrieved estimated distance and said fixed distance between said confocal unit and said decoating means; and calculate said displacement distance equal to the difference between said estimated distance and said focus distance.

According to a second aspect, the invention concerns a method for removing at least one portion of at least one coating system present in a multi-glazed window with an apparatus according to the first aspect of the invention; said method comprising the following steps:

mounting said apparatus on a first interface of said multi-glazed window;

using said optical system to detect on which interface said coating system is localized, and to estimate a distance between said decoating means and said detected interface;

moving said decoating means along said Z-axis in order to focus said decoating means on said detected interface; and removing at least one portion of the coating system applied on said detected interface with said decoating means by displacing said decoating means along said X and Y-axis in order to etch a predetermined shape from said coating system.

The optical system provides measures with a sufficient precision to focus the laser correctly on the coating system.

This optical system can be used either only at the start of the process to position the decoating means along the Z-axis for all the decoating displacements or all along the process.

Moreover, using a near infrared unit and a confocal unit, a calculation unit can estimate the distance between the decoating means and the detected interface with low calculation resources. Thus, during the removing of at least one portion of said coating system, the position of said coating system is preferably monitored in real time by said optical system to detect a difference between said estimated distance and said focus distance; when a difference is detected, said decoating means are moved of said difference along said Z-axis in order to adjust the focus position of said decoating means to be coincident on said detected interface.

This embodiment permits to overcome default of evenness in the multi-glazed window and permits to decoat curved multi-glazed windows. The invention can thus be used to decoat at least one portion of one coating system present in a multi-glazed window. Moreover, the invention can also be used to decoat multiple coating systems present in a multi-glazed window.

For instance, when said multi-glazed window comprising two coating systems applied on two different interfaces, said method comprises the following steps:

using said optical system to detect a first interface where a first coating system is applied, and estimate a first distance between said decoating means and the first detected interface;

using said optical system to detect a second interface where a second coating system is applied, and estimate a second distance between said decoating means and the second detected interface;

moving said decoating means along said Z-axis in order to focus said decoating means on said first detected interface;

modifying the first coating system applied on said first detected interface with said decoating means by displacing said decoating means along said X and Y-axis in order to etch a predetermined shape from said first coating system;

moving said decoating means along said Z-axis in order to focus said decoating means on said second detected interface; and modifying the second coating system applied on said second detected interface with said decoating means by displacing said decoating means in along said X and Y-axis in order to etch a predetermined shape from said second coating system.

BRIEF DESCRIPTION OF THE DRAWINGS/FIGURES

The different aspects of the present invention will now be described in more details, with reference to the appended drawings showing various exemplifying embodiments of the invention, which are provided by way of illustration and not of limitation. The drawings are a schematic representation and not true to scale. The drawings do not restrict the invention in any way. More advantages will be explained with examples.

DETAILED DESCRIPTION

Figure 1:
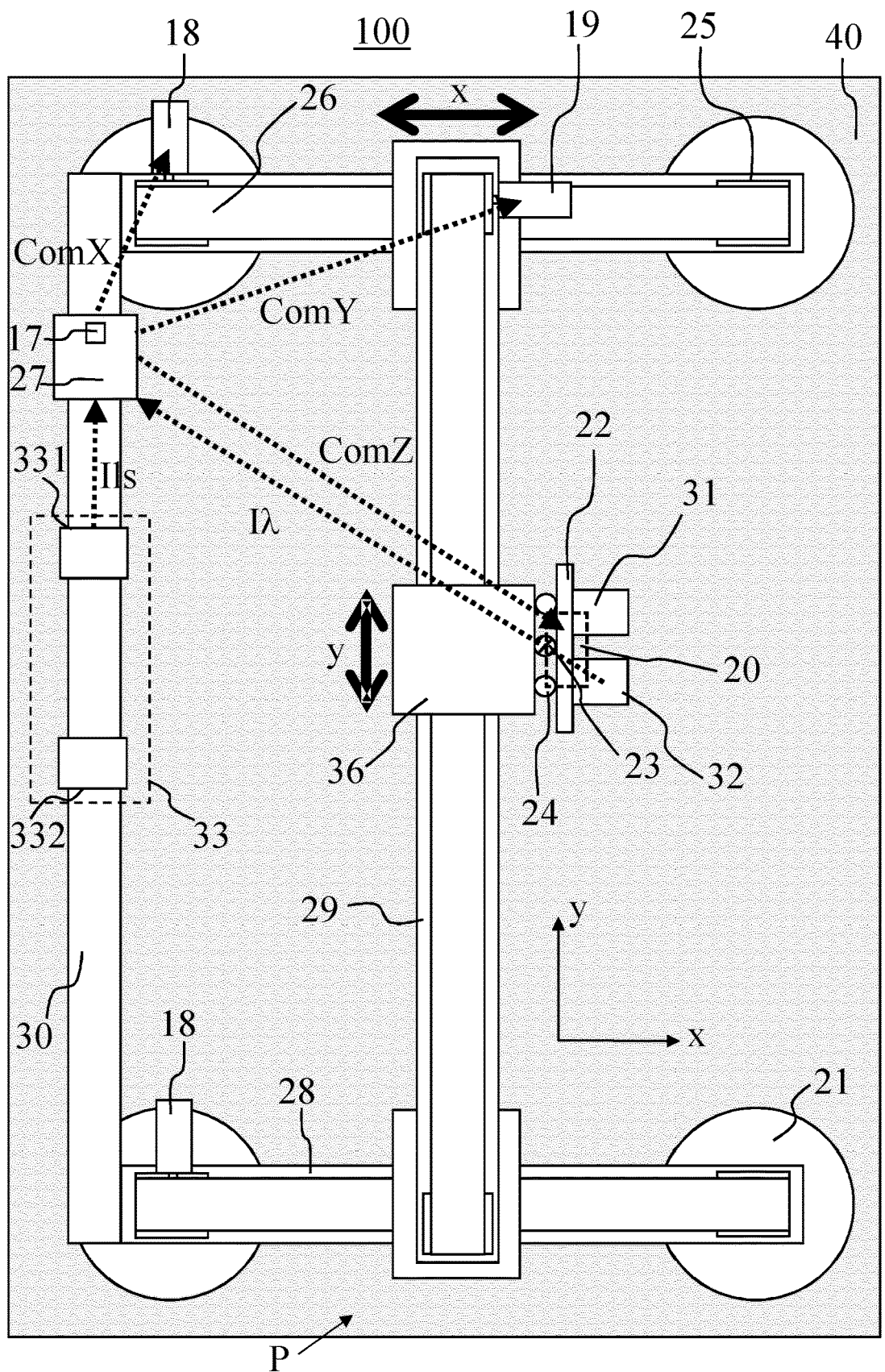
FIG. 1 depicts a front view of an apparatus according to an embodiment of the invention mounted on a multi-glazed window.

For a better understanding, the scale of each component in the drawing may be different from the actual scale. In the present specification, a three-dimensional coordinate system defined by three orthogonal axial directions is used, the longitudinal direction of the window 40 is defined as the X direction, the transversal direction is defined as the Y direction, and the normal direction to the window 40 is defined as the Z direction.

It is noted that the invention relates to all possible combinations of features recited in the claims or in the described embodiments.

The following description relates to an building window unit but it's understood that the invention may be applicable to others fields like automotive or transportation windows which have to be attached such as train.

FIG. 1 depicts an apparatus 100 mounted on a multi-glazed window 40. As illustrated on FIGS. 2 and 3, the multi-glazed window 40 can be made with a complex of three glass panels 401, 403, 406 alternatively separated by two interlayers 402, 405.

For instance, at least one interlayer 402, 405 is a space filled by a gas like argon to improve the thermal isolation of the multi-glazed window 40. One interlayer 402, 405 can also be made of a transparent material, typically polyvinyl butyral (PVB) or ethylene-vinyl acetate (EVA) order to keep the glass panels 401, 403, 406 bonded together even when they are broken. These transparent materials can prevent the glass from breaking up into harmful large pieces.

The material of the glass panels 401, 403, 406 can be made of soda-lime silica glass, borosilicate glass or alumino silicate glass. However, a glass panel can also refer to other materials such as thermoplastic polymers, polycarbonates, used especially for automotive applications. Hence, references to glass throughout this application should not be regarded as limiting. The glass panels 401, 403, 406 can be manufactured by a known manufacturing method such as a float method, a fusion method, a redraw method, a press molding method, or a pulling method. In any case, each face of each glass panel 401, 403, 406 forms an interface P1-P6 of the window 40.

Moreover, the FIGS. 1 to 5 illustrate a very complex situation where the multi-glazed window 40 contains three glass panels 401, 403, 406. The invention can be used for simpler multi-glazed window comprising only two glass panels. In this case, the multi-glazed window comprises only the fours interfaces P1-P4.

According to the invention, glass panels of the multi-glazed window can be processed, ie annealed, tempered, . . . to respect with the specifications of security and anti-thief requirements.

Glass panels can be a clear glass or a coloured glass, tinted with a specific composition of the glass or by applying an additional coating or a plastic layer for example. In case of several glass panels, in some embodiments, each glass panels can be independently processed and/or coloured, . . . in order to improve the aesthetic, thermal insulation performances, safety, . . . . The thickness of the glass panels is set according to requirements of applications.

In some embodiments, glass panels of the multi-glazed window is at least transparent for visible waves in order to see-through and to let light passing through.

According to the invention, the glass panel can be formed in a rectangular shape in a plan view by using a known cutting method. As a method of cutting the glass panel, for example, a method in which laser light is irradiated on the surface of the glass panel to cut the irradiated region of the laser light on the surface of the glass panel to cut the glass panel, or a method in which a cutter wheel is mechanically cutting can be used. The glass panel can have any shape in order to fit with the application, for example a windshield, a sidelite, a sunroof of an automotive, a lateral glazing of a train, a window of a building, . . . .

In addition, said multi-glazed window can be assembled within a frame or be mounted in a double skin façade, in a carbody or any other means able to maintain a glazing unit. Some plastics elements can be fixed on the glazing panel to ensure the tightness to gas and/or liquid, to ensure the fixation of the glazing panel or to add external element to the glazing panel.

In the present embodiment, the rectangle includes not only a rectangle or a square but also a shape obtained by chamfering corners of a rectangle or a square. The shape of the glass panel in a plan view is not limited to a rectangle, and may be a circle or the like.

In some embodiments, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned.

These interlayers keep the glass panels bonded together even when broken in such a way that they prevent the glass from breaking up into large sharp pieces.

Typically, the glass panels 401, 403, 406 and the interlayers 402, 405 are low in reflectance for Radio Frequencies (RF) radiations. However, at least one coating system 404, which is high in reflectance for RF radiations, is localized on at least one interface P1-P6 of the window 40. Interfaces are commonly named Pi, where i starts from 1 where P1 represents the interface facing outside of the building where the multi-glazed window is mounted on and P6 facing inside of the building where the multi-glazed window is mounted on. The apparatus 100 of the invention is configured to remove at least one portion of this at least one coating system 404.

Indeed, the coating system 404 can be a functional coating capable of either heating the surface of the windows 40, reducing the accumulation of heat in the interior of a building or a vehicle, or keeping the heat inside during cold periods for example. Although coating systems are thin and mainly transparent to the eyes.

The coating system 404 can be made of layers of different materials and at least one of this layer is electrically conductive. The coating system 404 of the present invention has an emissivity lower than 0.4. The coating system 404 of the present invention may comprise a metal-based low emissive coating system. These coatings are typically a system of thin layers comprising one or more, for example two, three or four, functional layers based on an infrared radiations reflecting material and at least two dielectric coatings, wherein each functional layer is surrounded by dielectric coatings. The coating system 404 of the present invention may in particular have an emissivity of at least 0.010. The functional layers are generally layers of silver with a thickness of a few nanometers, mostly about 5 to 20 nm. Concerning the dielectric layers, they are transparent and each dielectric layer is traditionally made of one or more layers of metal oxides and/or nitrides. For example, these different layers are deposited by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

For the coating system 404, a conductive film can be used. For instance, the conductive film can be a laminated film obtained by sequentially laminating a transparent dielectric, a metal film and a transparent dielectric. ITO, fluorine-added tin oxide (FTO) or the like can be used for that purpose. As for the metal film, it can be a film containing at least one main component selected from the group consisting of Ag, Au, Cu, and Al.

According to FIG. 1, the apparatus 100 is mounted on the first interface P1 of the window 40 with four suction pads 21 placed on the corners of the window 40. Two horizontal profiles 28 are fixed by two suction pads 21 and extend horizontally in the X direction. A transversal profile 29 is mounted movable in translation in the X direction on these two horizontal profiles 28.

The displacements of this transversal profile 29 are controlled by two synchronized motors 18 operating a pulley or a cog 25 and disposed on a first extremity of each horizontal profile 28. The other extremity of each horizontal profile 28 supports a pulley or a cog. A belt, a rope or a chain mounted on each horizontal profile 28 is stretched around the pulleys or the cogs of each extremity of the profiles 28. With the control of the motors 18, each belt, rope or chain rotates around the two pulleys or cogs, inducing the displacements in the X direction of the transversal profile 29.

The transversal profile 29 supports a robot head 36 movable in the Y direction relative to the transversal profile 29. The displacements of this robot head 36 are obtained by a motor 19 with a similar system comprising belt/rope/chain and pulley/cog.

In the embodiment of FIG. 1, using the motors 18, 19, the robot head 36 is then movable in the X and Y directions. Alternatively, the robot head 36 could be movable in the X and Y directions with one horizontal profile mounted over two transversal profiles. These directions X and Y form a plane P on which the robot head 36 is movable.

Even if the first interface P1 of the window 40 presents some default of evenness or a curved shape, the horizontal profiles 28 are placed at a sufficient distance from the suction pads 21 to obtain almost a plane P for the displacements of the robot head 36.

The robot head 36 is configured to carry the decoating means 31 of the coating system 404. Concerning the displacements in the directions X and Y of the decoating means 31 mounted over the robot head 36 to remove at least a portion of a coating system 404, the present invention is close to the invention described in the patent application WO 2015/050762 enclosed by reference.

Figure 2:
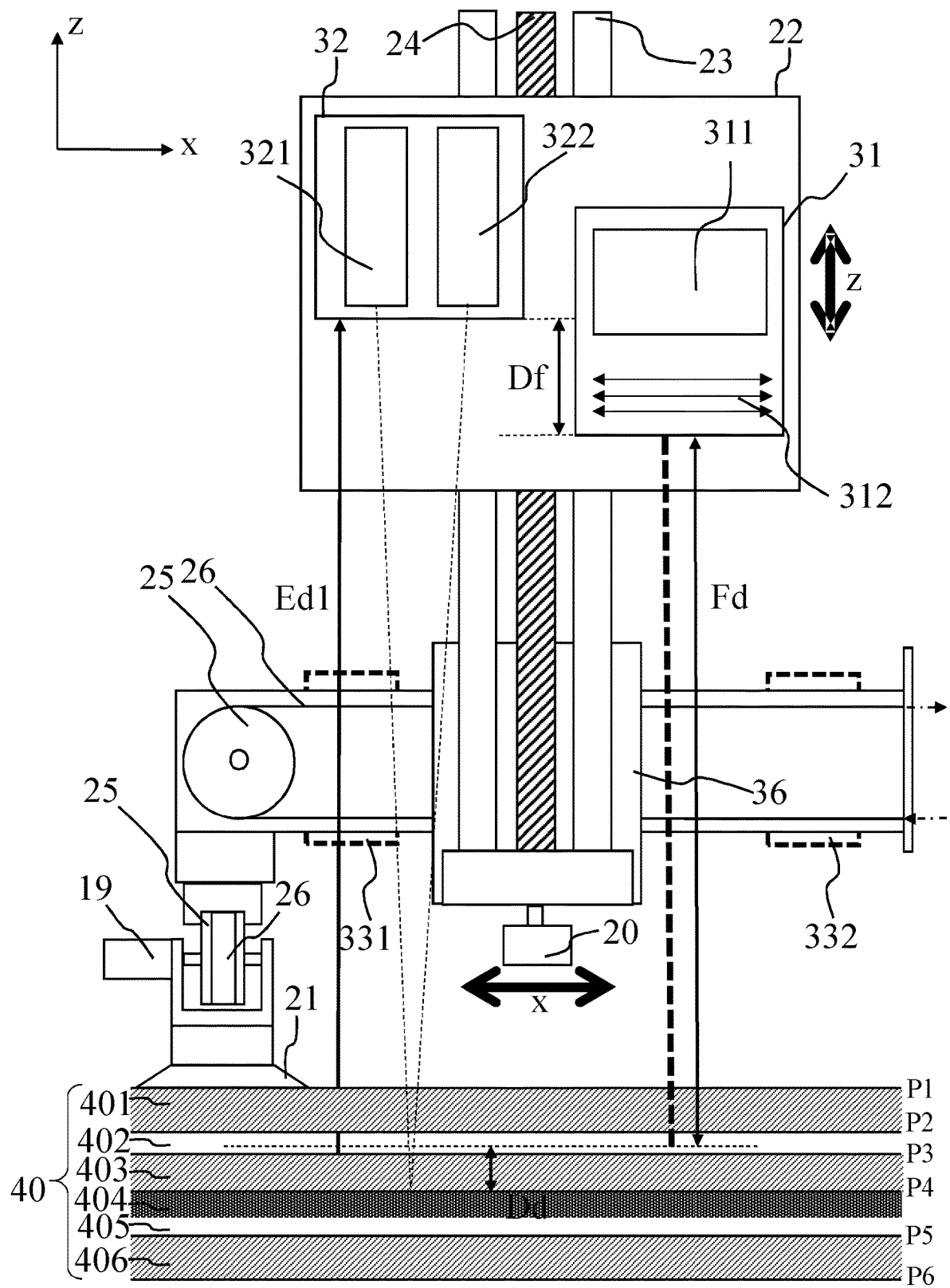
FIG. 2 depicts a side view of the apparatus of FIG. 1.
Figure 3:
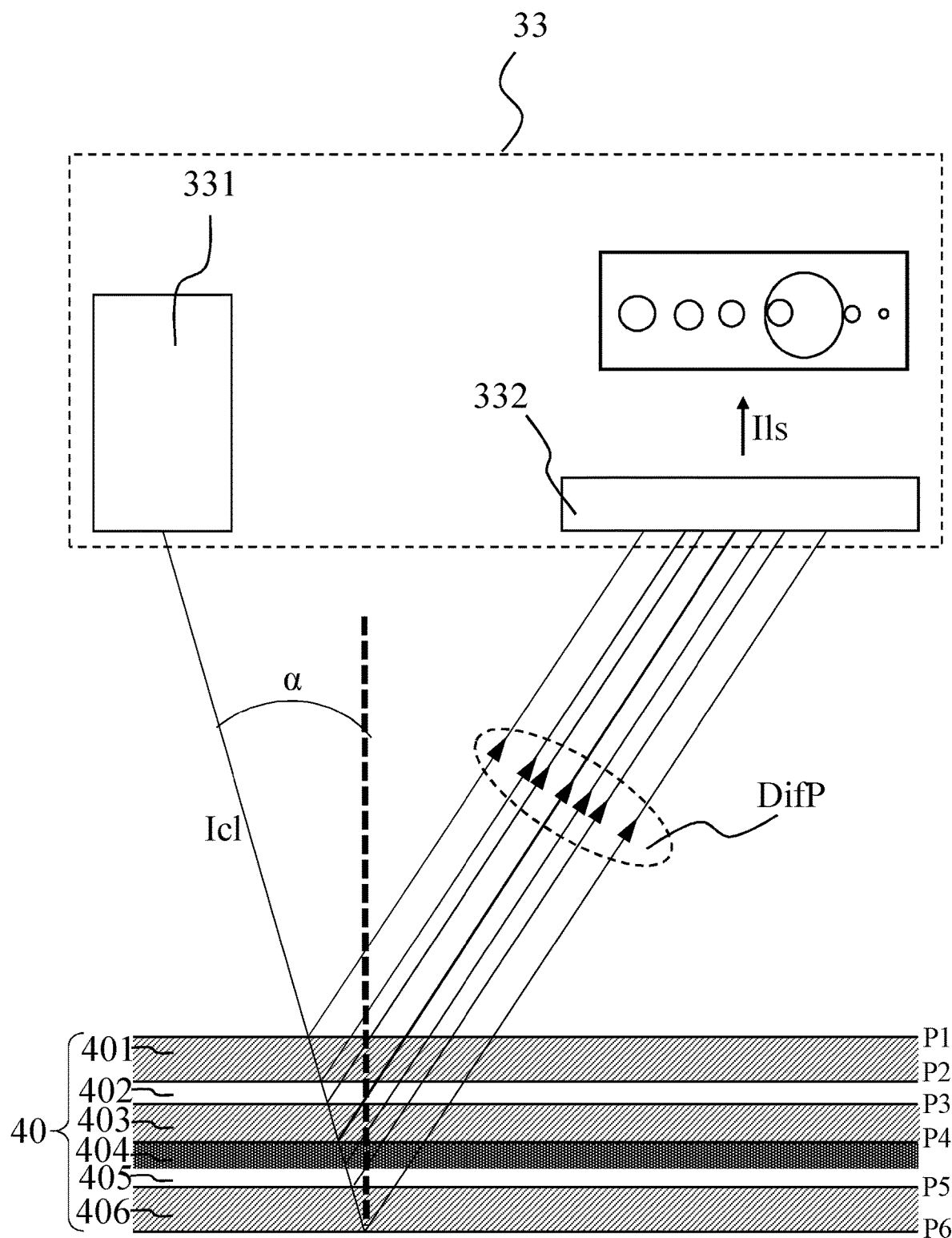
FIG. 3 depicts a side view of a near infrared unit of the apparatus of FIG. 1.
Figure 4:
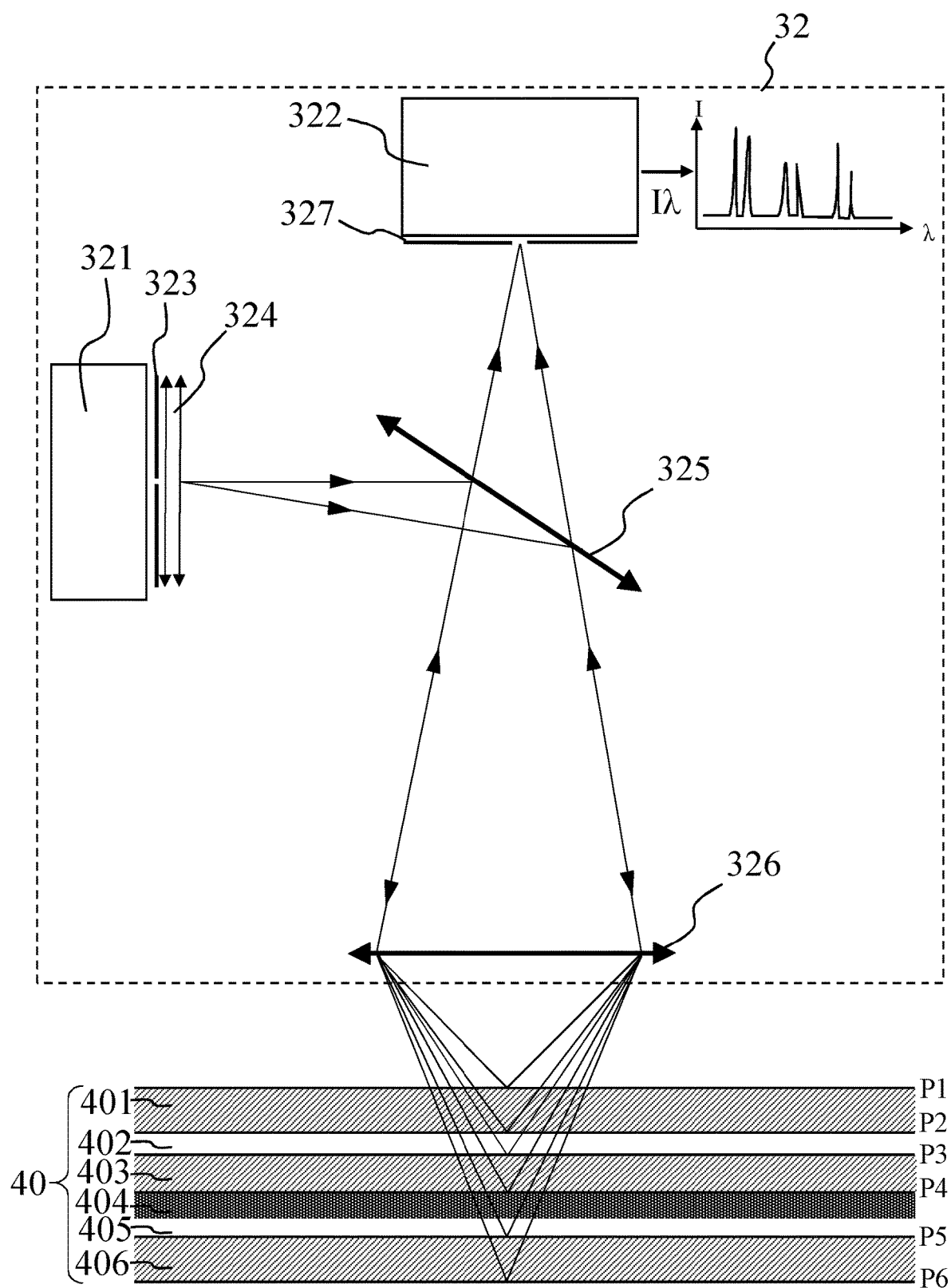
FIG. 4 depicts a side view of a confocal unit of the apparatus of FIG. 1.

In addition to the elements disclosed in this patent application WO 2015/050762, the invention comprises a shuttle 22, on which the decoating means 31 are mounted, movable in the Z direction relative to the robot head 36. The displacements of the shuttle 22 in the Z direction are preferably more accurate than the displacements of the robot head 36 in the X and Y directions. For instance, as depicted in FIG. 2, the shuttle 22 can be mounted on two guiding rods 24 and an endless screw 23 movable by a motor 20 fixed on the robot head 36. The endless screw 23 drives a nut fixed on the shuttle 22 in order to obtain a very precise displacement of the shuttle 22 and thus a very precise displacement of the decoating means 31 in the Z direction relative to the coating system 404. For instance, the shuttle 22 can be movable between 100 and 500 mm away from the window 40.

Indeed, the decoating means 31 include a laser source 311 and a lens array 312 with a focal point localized at a focus distance Fd. According to the invention, the laser source 311 corresponds to the point where the laser beam is generated in direction to the lens array 312. Before this point, the laser beam can be generated by an optical generator and transmitted from this optical generator to the laser source 311 through an optical fiber. Thus, when the invention recites that the decoating means 31 are mounted on the shuttle 22, only the lens array 312 and the end of the optical fiber forming the laser source 311 can be mounted on the shuttle 22 when the optical generator is distant from the shuttle 22.

To maximize the efficiency of the decoating means 31 on the coating system 404, the focal point must be precisely positioned on the coating system 404. Thus, the distance Ed2 between the decoating means 31 and the coating system 404 must be equal to the focus distance Fd of the decoating means 31.

To this end, the invention proposes to use at least one optical system 32-33 to detect on which interface P4 the coating system 404 is localized, and to estimate a distance Ed2 between said decoating means 31 and the detected interface P4. A calculating unit 17 can then compare the distance Ed2 with the focus distance Fd and a displacement control unit 27 can then displace the decoating means 31 to focus the laser beam on the coating system 404 i.e to match the distance Ed2 between the decoating means 31 with the focus distance Fd of the decoating means 31.

Preferably, the displacement control unit 27 controls the motors 18-20 with the help of three different signals ComX, ComY and ComZ. Hence, the shuttle 22 is displaceable along the three directions of space X, Y and Z.

In order to obtain a detection of the interface P4 on which the decoating system 404 is localized, it is possible to use two different optical systems: a near infrared unit 33 and a confocal unit 32.

The confocal unit 32 consists of two sub-parts: confocal and chromatism. The confocal side requires at least a polychromatic light source 321 and a detector 322.

Preferably, the polychromatic light source 321 and the detector 322 are mounted on the shuttle 22. As the laser source 311, the polychromatic light source 321 can be generated by an optical generator and transmitted from this optical generator to the shuttle 22 through an optical fiber. Additionally, the detector 322 can also contain an optical fiber fixed on the shuttle 22 to acquire and transmit the reflected beam.

The polychromatic light source 321 is focused on the multi-glazed window 40 via a pinhole 323, for example a mask with a minuscule hole, and an array of lenses 324. A beam is reflected on a boundary between two layers with a different refractive index. The refracted beams travel via the lenses 324, 325 and a beam splitter 326 to the detector 322, in front of which there is also a pinhole 327.

As a consequence, everything in the sample which is not in focus is also not displayed on the detector 322.

These reflected beams fall outside of the tiny hole. Thus, the detector 322 can only see something that is in perfect focus because the pinhole 327 of the detector 322 blocks all other reflections, whether they are to the left or to the right, higher or lower. Therefore, the confocal unit 32 provides a sharp focus area for the interfaces P1-P6 of the multi-glazed window 40.

Then, there is the chromatic side. The way a lens 326 focuses light depends on the wavelength. When using a positive lens 326, red light is the least refracted. Thus, the focal point lies too far from the lens 326. Violet light is, however, strongly deflected and has its focal point closer to the lens 326. Using a polychromatic light source 321 that contains a broad spectrum of wavelengths on such a lens 324, a rainbow of focal points is developed.

The confocal unit 32 combines this light property with the existing confocal properties. Because each wavelength has its own focal point, the colour that the detector 322 receives is a very precise measurement of the distance to the reflective surface P1-P6.

After all, there is only one wavelength in which the focal point exactly coincides with a reflective surface. The result of a scan over the interfaces P1-P6 of the multi-glazed window 40 is a colour-coded micro-topography.

The detector 322 behind the pinhole 327 or a calculating unit 17 can decode this information and transform the wavelengths detected to distances between the confocal unit 32 and the interfaces P1-P6 of the multi-glazed window 40. With perfect points on the pinholes 321, 327, a Dirac function should appear on the wavelengths detected by the detector 322. However, in practice, this is not feasible.

Even if the pinholes 321, 327 have a very small diameter, approximately 1.8 microns, a Gaussian curve is obtained for each wavelength detected and the distance of each interface P1-P6 is estimated from the peak wavelengths. Indeed, the confocal unit 32 can achieve a resolution of 7 nanometres with a single measurement. If necessary, the precision could be improved by multiple measurements with movement of the confocal unit 32.

Indeed, the confocal unit 32 provides a measure $I\lambda$ of the variation of the intensity I of the peak for different wavelengths.

Preferably, the polychromatic light source 321 and the detector 322 are fixed on the shuttle 22 with a distance Df along said Z-axis from the decoating means 31. For instance, this fixed distance Df could be 60 mm.

The near infrared unit 33 is simpler. This near infrared unit 33 also comprises a light source 331 and a detector 332. The light source 331 is preferably monochromatic with a wavelength comprised between 700 and 1100 nm, preferably 850 nm. The detector 332 corresponds to an array of photodiodes, a CMOS camera sensor or a 2D silicon detector.

The light source 331 shines on the window 40 with an angle α. The transparency of the window 40 induces a reflection of the light in the form of a diffraction pattern DifP emitted by the light source 331 on each interfaces P1-P6 of the window 40.

The detector 332 then collects the diffraction pattern DifP. Due to the angle formed between the light source 331 and the detector 332, the detector 332 can observe different spots at different positions depending on the corresponding reflecting interface P1-P6. Moreover, the interface P4 where the coating system 404 is localized reflects more strongly than the other interfaces P1-P3, P5-P6. Indeed, the near infrared unit 33 provides a picture Ils where different spots with variable intensity are visible.

Thus, the confocal unit 32 and the near infrared unit 33 are configured to send the measures $I\lambda$ and Ils to a calculating unit 17 implemented inside the displacement control unit 27.

Alternatively, when an unknown coating system composition is applied on the multi-glazed window, a coating type detector means can also be used to adapt directly some parameters of the laser, such as the power of the laser, when the apparatus is mounted on said window to optimize the decoating. This means avoids to configure such parameters of the laser before the mounting.

Figure 5:
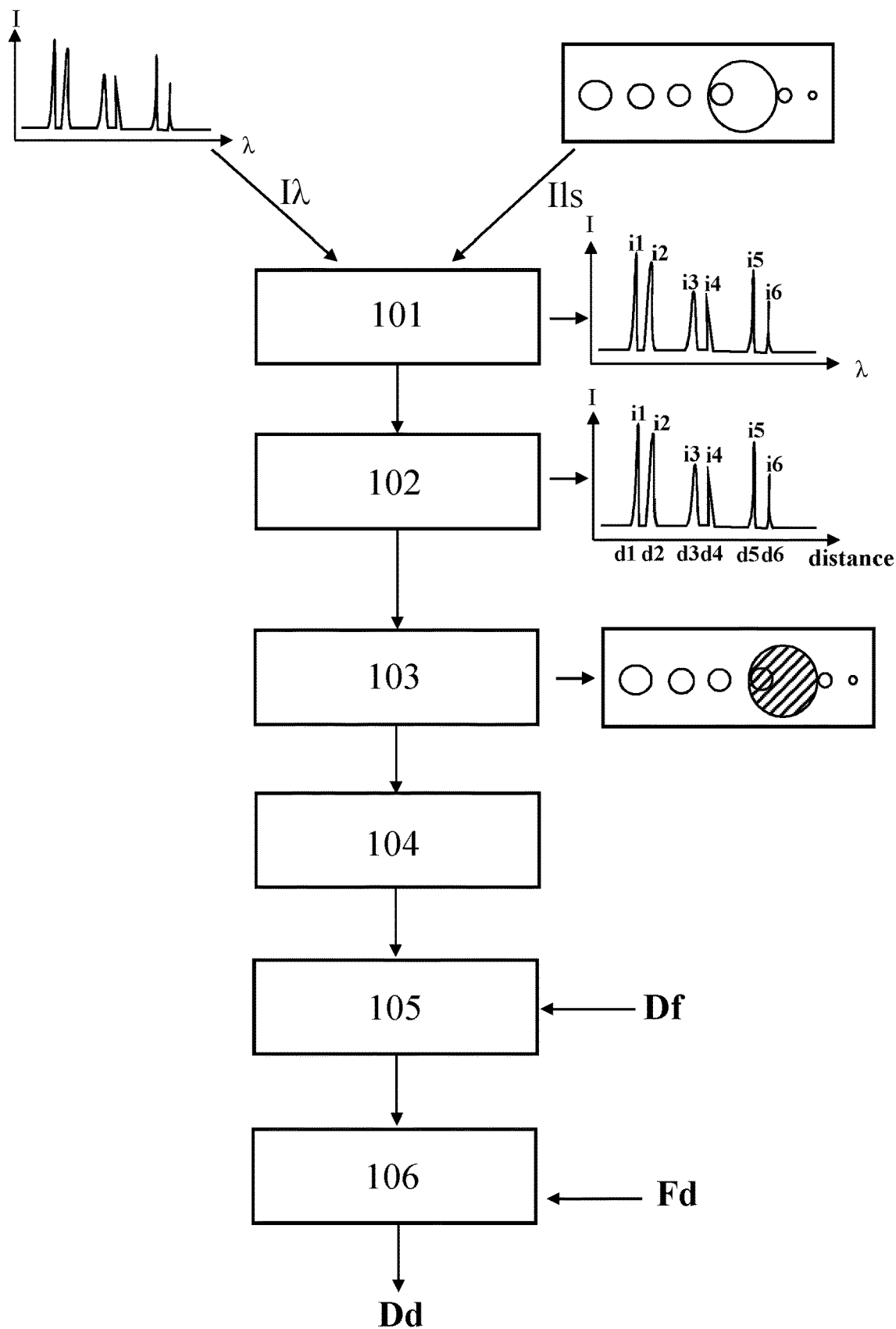
FIG. 5 depicts a chart of the steps realized by a calculation unit of the apparatus of FIG. 1.

As depicted in FIG. 5, the calculating unit 17 is configured to calculate a displacement distance Dd based on the measures $I\lambda$ and Ils and two constants Df and Fd. The first constant Df corresponds to the fixed distance between the decoating means 31 and the confocal unit 32. In this example, the first constant Df is 60 mm. The second constant Fd corresponds to the focusing distance of the decoating means 31. In this example, the second constant Fd is 160 mm.

In a first step 101, the calculating unit 17 uses the measure a to determine the number of interfaces P1-P6 detected by the confocal unit 32. Thus, each wavelength peak is associated to a number of interfaces. Using the confocal and the chromatic sides of the confocal unit 32, the calculating unit 17 can then estimate the distance between the confocal unit 32 and each of the detected interfaces, during step 102.

The relation between the wavelengths and the distance can be calibrated with several measurements on reference samples. As a result, the calculating unit 17 can fulfil the following table with the number of each detected interface and the distance between the confocal unit 32 and each detected interface:

| | |
|---|---|
| d1 | 180 mm |
| d2 | 190 mm |
| d3 | 195 mm |
| d4 | 205 mm |
| d5 | 225 mm |
| d6 | 230 mm |

If the window 40 is thicker than the resolution depth of the confocal unit 32, the motor 20 can be used in this step to move the confocal unit 32 along the Z axis and improve the depth of the analysis inside the window 40. Obviously, if the confocal unit 32 is moved, the moving distance must be added to the new measures obtained by the calculating unit 17 in order to detect all of the interfaces P1-P6 of the window 40.

At this stage, the calculating unit 17 doesn't know where the coating system 404 is positioned inside the window 40. Thus, a third step 103 is used to identify on which interface P1-P6 the coating system 404 is localized with the measure Ils of the near infrared unit 33. This measure Ils presents a picture with multiple spots where a larger spot corresponds to the reflection of most of the near infrared light.

The spot illustrated on the left side of the picture corresponds to the reflection on the first interface P1 and the second spot from the left side of the picture corresponds to the reflection on the second interface P2 . . . . The fourth spot from the left side of the picture is covered by the larger spot of the picture meaning that the coating system 404 is localized on the fourth interface P4. The intensity of the spot detected after the larger spot are smaller compared to the intensity of the first spots because the coating system 404 has reflected most of the light emitted by the near infrared source 331.

To detect the interface where the coating system 404 is localized, the calculating unit 17 can thus count the number of spots detected before the largest spot. At the end of this step 103, the calculating unit 17 knows that the spot of the maximum intensity corresponds to the fourth spot detected by the near infrared unit 33.

The step 104 permits to match the results of the analysis of the measures Iλ and Ils. Thus, the calculating unit 17 is configured to retrieve the distance to the fourth interface detected by the confocal unit 32.

At the end of this stage, the calculating unit 17 can estimate the distance Ed1 between the confocal unit 32 and coating system 404. According to this example, this distance Ed1 corresponds to 205 mm.

Knowing the distance Df between the decoating means 31 and the confocal unit 32, the step 105 calculates the estimated distance Ed2 between the decoating means 31 and the coating system 404. According to this example, this distance Ed2 corresponds to Ed1−Df=205−60=145 mm.

The displacement distance Dd can then be calculated, on a last step 106, with the difference between the estimated distance Ed2 and the focus distance Fd. According to this example, this displacement distance Dd is calculated at Ed2−Fd=145−160=−15 mm. Thus, the displacement control unit can control the motor 20 to move the shuttle 22 on the right direction along 15 mm in order to focus the decoating means 31 on the coating system 404.

This displacement Dd can be used at a preliminary stage of a process of decoating prior to the use of the lase source 311.

For instance, a process of decoating a window 40 contains a first step where the apparatus 100 is mounted on the first interface P1 of a window 40. After the first step, the optical system 32-33 and the displacement control unit 27 are used to position the shuttle 22 in order to focus the decoating means 31 on the detected interface P4.

At the end of this preliminary stage, the decoating means 31 can be used to remove at least one portion of the coating system 404 by displacing the decoating means 31 along the X and Y-axis in order to etch a predetermined shape from said coating system 404.

After the preliminary stage, the optical system 32-33 and the displacement control unit 27 can also be used to focus, in real time, the decoating means 31 on the coating system 404 during the displacements along the X and Y-axis. Thus, the apparatus 100 can overcome default of evenness and permits to decoat curved multi-glazed window.

Moreover, if the window 40 presents two coating systems 404 applied on two different interfaces, the optical system 32-33 and the displacement control unit 27 can be used to move the position the shuttle 22 in order to focus the decoating means 31 on the second coating system 404 after the decoating of the first coating system 404.

Indeed, the invention permits to improve the existing processes of decoating a multi-glazed windows 40. This invention can be used for multiple kind of multi-glazed windows including at least one coating system 404, where the position and the thickness of the glass panels 401, 403, 406 and the position of the coating system 404 can vary. Moreover, the invention is able to work when the multi-glazed window is already mounted on a structure.

The invention claimed is:

1. An apparatus for removing at least one portion of at least one coating system present in a multi-glazed window comprising at least two glass panels and at least one interlayer between each pair of adjacent glass panels, forming multiple interfaces (P1-P6); the apparatus comprising:
   a decoating means including a laser source and a lens array configured to focus the laser source at a focus distance (Fd); and
   two motors configured to move the decoating means along a plane (P), defined by a longitudinal axis X and a transversal axis Y;
   wherein the apparatus further comprises:
   one optical system configured to detect on which interface (P4) the coating system is localized, and to estimate a distance (Ed2) between the decoating means and the detected interface (P4);
   at least a third motor configured to control a position of the decoating means along a Z-axis, orthogonal to the X and Y axes;
   a displacement control unit of the third motor configured to displace the decoating means a displacement distance (Dd) equal to a difference between the estimated distance (Ed2) and the focus distance (Fd) in order to focus the decoating means on the detected interface (P4) of the at least one coating system;
   at least two fixing points configured to mount the apparatus on a first interface (P1) of the multi-glazed window;
   a support structure mounted on the at least two fixing points;
   a robot head mounted on the support structure movable by the two motors along the longitudinal axis X and the transversal axis Y relative to the support structure; and
   a shuttle, carrying the decoating means, mounted on the robot head movable by the third motor along the Z-axis relative to the robot head,
   wherein the shuttle is movable along the Z-axis between 100 and 500 mm away from the first interface of the multi-glazed window.

2. The apparatus according to claim 1, wherein the optical system detects on which interface (P4) the coating system is localized by a near infrared unit comprising:
   at least one near infrared light source configured to emit an incident light (Icl) toward the multi-glazed window, and to generate a diffraction pattern (DifP) after refraction on the multi-glazed window; and
   at least one detector configured to measure an intensity of light spots (Ils) of the diffraction pattern (DifP); wherein each light spot corresponds to an
   interface (P1-P6) in the multi-glazed window, and a spot of maximum intensity corresponds to the detected interface (P4) on which the coating system is localized.

3. The apparatus according to claim 2, wherein the at least one near infrared unit is fixed relative to the support structure.

4. The apparatus according to claim 2, wherein the at least one near infrared light source is monochromatic with a wavelength between 700 and 1100 nm.

5. The apparatus according to claim 2, wherein the at least one detector of the near infrared unit corresponds to an array of photodiodes, a CMOS camera sensor or a 2D silicon detector.

6. The apparatus according to claim 2, wherein the estimation of the distance (Ed2) between the decoating means and the detected interface (P4) is obtained by a confocal unit comprising:
   at least one polychromatic light source configured to emit an incident light, punctual or in line, with several wavelengths toward the multi-glazed window, an optical element focalizing the incident light with different focus distances depending on the wavelength; and
   at least one detector configured to receive light refracted by the multi glazed window and detect the light intensity for each wavelength of the polychromatic light source; the wavelengths with intensity peaks being the ones with a focus distance corresponding to an interface (P1-P6) in the multi-glazed window; the estimated distance (Ed2) being calculated based on the wavelength with the intensity peak associated with the detected interface (P4).

7. The apparatus according to claim 6, wherein the at least one polychromatic light source and the at least one detector are mounted on the shuttle with a fixed distance along the Z-axis from the decoating means.

8. The apparatus according to claim 7, wherein the apparatus comprises a calculation unit configured to:
   determine a number of the interfaces detected by the confocal unit in view of the number of wavelengths with intensity peaks;
   estimate the distances between the said confocal unit and the interfaces (P1-P6); identify at least one most relevant interface (P4) corresponding to a spot of maximum intensity detected by the near infrared unit;
   retrieve a first estimated distance (Ed1) of the detected interface (P4) matching with the identified most relevant interface:
   calculate the estimated distance (Ed2) between the decoating means and the detected interface (P4) equal to a sum of the first estimated distance (Ed1) and a fixed distance (Df) between the confocal unit and the decoating means; and
   calculate the displacement distance (Dd) equal to a difference between the estimated distance (Ed2) and the focus distance (Fd).

9. The apparatus according to claim 2, wherein the at least one near infrared light source is monochromatic with a wavelength of 850 nm.

10. A method for removing at least one portion of at least one coating system present in a multi-glazed window with an apparatus according to claim 1; the method comprising:
   mounting the apparatus on a first interface (P1) of the multi-glazed window;
   using the optical system to detect on which interface (P4) the coating system is localized, and to estimate the distance (Ed2) between the decoating means and the detected interface (P4);
   moving the decoating means along said Z-axis to focus the decoating means on the detected interface (P4); and
   removing at least one portion of the coating system applied on the detected interface (P4) with the decoating means by displacing the decoating means along the X and Y axes to etch a predetermined shape from the coating system.

11. The method according to claim 10, wherein, during the removing of the at least one portion of the coating system, the position of the coating system is monitored in real time by the optical system to detect a difference between the estimated distance (Ed2) and the focus distance (Fd); when a difference is detected, the decoating means are moved the difference along the Z-axis to adjust a focus position of the decoating means to be coincident on the detected interface (P4).

12. The method according to claim 11, wherein the multi-glazed window comprises two coating systems applied on two different interfaces (P1-P6), the method comprises:
   using the optical system to detect a first interface (P1-P6) where a first coating system is applied, and estimate a first distance between the decoating means and the first detected interface (P1-P6);
   using the optical system to detect a second interface (P1-P6) where a second coating system is applied, and estimate a second distance between the decoating means and the second detected interface (P1-P6);
   moving the decoating means along the Z-axis to focus the decoating means on the first detected interface (P1-P6);
   modifying the first coating system applied on the first detected interface (P1-P6) with the decoating means by displacing the decoating means along said X and Y axes to etch a predetermined shape from the first coating system;
   moving the decoating means along the Z-axis to focus the decoating means on the second detected interface (P1-P6); and
   modifying the second coating system applied on the second detected interface (P1-P6) with the decoating means by displacing the decoating means along the X and Y axes to etch a predetermined shape from the second coating system.

13. An apparatus for removing at least one portion of at least one coating system present in a multi-glazed window comprising at least two glass panels and at least one interlayer between each pair of adjacent glass panels, forming multiple interfaces (P1-P6); the apparatus comprising:
   a decoating means including a laser source and a lens array configured to focus the laser source at a focus distance (Fd); and
   two motors configured to move the decoating means along a plane (P), defined by a longitudinal axis X and a transversal axis Y;
   wherein the apparatus further comprises:
   one optical system configured to detect on which interface (P4) the coating system is localized, and to estimate a distance (Ed2) between the decoating means and the detected interface (P4);
   at least a third motor configured to control a position of the decoating means along a Z axis, orthogonal to the X and Y axes;
   a displacement control unit of the third motor configured to displace the decoating means a displacement distance (Dd) equal to a difference between the estimated distance (Ed2) and the focus distance (Fd) in order to focus the decoating means on the detected interface (P4) of the at least one coating system;
   at least two fixing points configured to mount the apparatus on a first interface (P1) of the multi-glazed window;
   a support structure mounted on the at least two fixing points;
   a robot head mounted on the support structure movable by the two motors along the longitudinal axis X and the transversal axis Y relative to the support structure; and
   a shuttle, carrying the decoating means, mounted on the robot head movable by the third motor along the Z axis relative to the robot head,
   wherein the optical system detects on which interface (P4) the coating system is localized by a near infrared unit comprising:
   at least one near infrared light source configured to emit an incident light (Icl) toward the multi-glazed window, and to generate a diffraction pattern (DifP) after refraction on the multi-glazed window; and
   at least one detector configured to measure an intensity of light spots (Ils) of the diffraction pattern (DifP); wherein each light spot corresponds to an interface (P1-P6) in the multi-glazed window, and a spot of maximum intensity corresponds to the detected interface (P4) on which the coating system is localized.

\* \* \* \* \*